United States Patent [19]

Suenobu et al.

[11] 4,376,181

[45] Mar. 8, 1983

[54] STABILIZED ANTIFOULING PAINT COMPOSITION

[75] Inventors: Koreyoshi Suenobu, Buzen; Yasuhiro Hidaka, Sakai; Tetsuji Ike, Fukuoka, all of Japan

[73] Assignee: Yoshitomi Pharmaceutical Industries Ltd., Osaka, Japan

[21] Appl. No.: 302,419

[22] PCT Filed: Jan. 30, 1981

[86] PCT No.: PCT/JP81/00021

§ 371 Date: Sep. 15, 1981

§ 102(e) Date: Sep. 15, 1981

[87] PCT Pub. No.: WO81/02162

PCT Pub. Date: Aug. 6, 1981

[51] Int. Cl.$^3$ ............................................. C09D 5/14
[52] U.S. Cl. ................... 524/343; 106/15.05; 106/16; 424/141; 424/288; 523/122; 524/347; 524/351; 524/431

[58] Field of Search ............... 106/15.05, 16; 424/288, 424/141; 260/45.95 B, 45.95 E, 45.95 H; 524/343, 347, 351, 431; 523/122

[56] References Cited

U.S. PATENT DOCUMENTS

| | | | |
|---|---|---|---|
| 3,392,157 | 7/1968 | Izumi | 260/45.95 H |
| 4,139,515 | 2/1979 | Dennington | 106/15.05 |
| 4,191,579 | 3/1980 | Hails et al. | 106/15.05 |
| 4,270,953 | 6/1981 | Nakagawa et al. | 106/16 |

*Primary Examiner*—Lorenzo B. Hayes
*Attorney, Agent, or Firm*—Berman, Aisenberg & Platt

[57] ABSTRACT

There is provided an antifouling paint composition stabilized against viscosity increase and gelation during storage, which comprises a triorganotin-containing polymer and cuprous oxide as combined active ingredients, a stabilizing amount of a hindered phenol, and a solvent therefor.

12 Claims, No Drawings

STABILIZED ANTIFOULING PAINT COMPOSITION

TECHNICAL FIELD AND DISCLOSURE OF THE INVENTION

This invention relates to a stabilized antifouling paint composition. More particularly, it relates to an antifouling paint composition stabilized against viscosity increase and gelation during storage, which comprises a triorganotin-containing polymer, cuprous oxide and a stabilizer.

So far, paints, e.g. vinyl-resin antifouling paints (continuous contact paints) and rosin-type antifouling paints (soluble matrix paints), containing cuprous oxide as an active antifouling ingredient have been used for preventing marine organisms, such as the barnacle and sea lettuce, from sticking to ship hulls and various marine constructions. However, the initial rate of dissolution of the copper ion is so great with them that the antifouling effect cannot be maintained for long. They are also problematic with regard to resistance to alkalis, drying behavior, film strength and so forth, and consequently are not satisfying antifouling paints.

To overcome these disadvantages, triorganotin compounds, such as triphenyltin salts and tributyltin salts, have been employed. Recently, triorganotin-containing polymers which are salts from triorganotin oxides or hydroxides or halides and high-molecular-weight compounds, such as various carboxyl-containing acrylic or alkyd resins, have become objects of attention as antifoulants superior to said simple triorganotin salts.

Antifouling paints containing the triorganotin-containing polymers as antifouling ingredients can maintain their antifoulant performance over a prolonged period of time at minimum and constant rates of dissolution or leaching of the active ingredients. They are epoch-making paints which also have an increased safety in coating with them and bring about a reduction in fuel costs. Supposedly, the superior characteristics of these triorganotin-containing polymers result from the fact that they are slowly hydrolyzed in sea water and the release of the active ingredients, namely triorganotin components, is thereby controlled.

While the triorganotin-containing polymers may be used alone, they are usually used in combination with inorganic copper compounds so as to attain constant antifouling effects. However, when cuprous oxide is combinedly used with the triorganotin-containing polymers to prepare antifouling paints, the paints are subject to changes during storage, which lead to viscosity increase and eventually to gelation. To solve this problem, attempts have been made, such as the two-component system in which cuprous oxide and a triorganotin-containing polymer are mixed just prior to coating therewith (e.g. Japanese Patent Application laid open (Kokai) under No. 119,534/1979) and the use of expensive and highly toxic copper rhodanide in place of cuprous oxide (e.g. Japanese Patent Applications laid open under Nos. 50,236/1978 and 125,233/1979). However, none are satisfactory.

As a result of intensive research by the present inventors on the method of stabilizing antifouling paints containing (as active ingredients) cuprous oxide, which has so far been used and is safer and inexpensive, and a triorganotin-containing polymer for storage for a prolonged period, it has now been found that such antifouling paints can be stabilized against viscosity increase and gelation by the addition of a small but effective amount of a hindered phenol. This finding has led to the present invention.

Thus, the invention provides an antifouling paint composition stabilized against viscosity increase and gelation, which comprises a triorganotin-containing polymer and cuprous oxide as combined active ingredients, a stabilizing amount of a hindered phenol, and a solvent therefor.

The triorganotin-containing polymer, which is the active ingredient to be used in the practice of the present invention, includes homopolymers of a triorganotin salt of an unsaturated carboxylic acid, such as acrylic, methacrylic, maleic or itaconic acid, copolymers thereof with each other or with a copolymerizable unsaturated compound, such as vinyl chloride, vinyl acetate, vinylidene chloride, alkyl acrylate or methacrylate, styrene or vinyltoluene, or a mixture thereof, and further triorganotin salts of a high-acid-value carboxyl-containing alkyd or acrylic resin. Preferred are copolymers of tributyltin or triphenyltin methacrylate and methyl methacrylate as well as copolymers of tributyltin or triphenyltin methacrylate, methyl methacrylate and an alkyl acrylate such as methyl, ethyl, butyl or 2-ethylhexyl acrylate, and the like copolymers.

The antifouling paint composition of the present invention may contain, in addition to the above-mentioned triorganotin-containing polymer, a resin, such as natural resin, chlorinated rubber, chlorinated polyethylene, vinyl copolymer resin or epoxy resin, for increasing film strength or controlling viscosity or for improving dispersibility of cuprous oxide, which is another active ingredient. The composition may also contain any other conventional paint ingredients, such as extenders, pigments and plasticizers, unless these react with the stabilizing agent in accordance with the present invention and adversely affect the paint performance. The amount of each paint ingredient can be selected depending upon the pigment volume concentration, antifoulant performance and other factors.

The hindered phenol, which is the stabilizing agent in accordance with the present invention, includes those phenolic compounds that have at least one tertiary alkyl group or an equivalent thereto ortho to the hydroxyl group. Preferred examples are 2,6-di-tert-butylphenol, 2,6-di-tert-butyl-alpha-dimethylamino-p-cresol, tert-butylhydroquinone, 2,5-di-tert-butylhydroquinone, 2,5-di-tert-amylhydroquinone, 2,2'-methylenebis(4-methyl-6-tert-butylphenol), and 2,2'-methylenebis(4-ethyl-6-tert-butylphenol). Other examples are 2,6-di-tert-butyl-p-cresol, 2,4-dimethyl-6-tert-butylphenol, butylated hydroxyanisole, 4,4'-butylidenebis(3-methyl-6-tert-butylphenol), 4,4'-thiobis(3-methyl-6-tert-butylphenol), tetrakis(3-(3,5-di-tert-butyl-4-hydroxyphenyl)propionyloxymethyl)methane, octadecyl 3-(3,5-di-tert-butyl-4-hydroxyphenyl)propionate, 1,1,3-tris(2-methyl-4-hydroxy-5-tert-butylphenyl)butane, 1,3,5-trimethyl-2,4,6-tris(3,5-di-tert-butylbenzyl)benzene, and 2,2'-methylenebis(6-(1-methylcyclohexyl)-p-cresol). The amount of the stabilizing agent is not critical. However, in view of formulations generally employed, antifoulant performance, economy and other factors, the stabilizing agent is used, for example, in an amount of 0.1-3% by weight, preferably 0.5-1% by weight, based on the whole paint composition.

The active ingredients (the triorganotin-containing polymer and cuprous oxide) are used in an antifouling amount. And the ratio of the triorganotin-containing polymer and cuprous oxide can be selected referring to known combined paint composition of this kind.

Aliphatic and aromatic hydrocarbons, such as heptane, toluene and xylene, and mixtures thereof may serve as the solvents. Some ketones, esters and halogenated hydrocarbons may also be used.

The following examples will illustrate the present invention in more detail.

EXAMPLE 1

Polymer Preparation 350 g of tributyltin methacrylate and 150 g of methyl methacrylate were dissolved in 500 g of xylene, and then 2.5 g of benzoyl peroxide was added as a polymerization initiator. Polymerization was carried out at 90°–110° C. for 10 hours, to give a slightly yellow, viscous, 50% copolymer solution in xylene. The weight average molecular weight of the copolymer as measured by gel permeation chromatography was 83,000.

EXAMPLE 2

Polymer Preparation 325 g of tributyltin methacrylate, 125 g of methyl methacrylate and 50 g of butyl acrylate were dissolved in 500 g of xylene, 2.5 g of benzoyl peroxide was added as a polymerization initiator, and polymerization was effected at 80°–100° C. for 8 hours to give a slightly yellow, viscous, 50% copolymer solution in xylene. The weight average molecular weight of the copolymer as measured by gel permeation chromatography was 75,000.

EXAMPLE 3

Polymer Preparation 250 g of tributyltin methacrylate, 200 g of methyl methacrylate and 50 g of 2-ethylhexyl acrylate were dissolved in 500 g of xylene, 2.5 g of alpha,alpha'-azobisisobutyronitrile was added as a polymerization initiator, and polymerization was effected at 80°–85° C. for 4 hours to give a slightly yellow, viscous, 50% copolymer solution in xylene. The weight average molecular weight of the copolymer as measured by gel permeation chromatography was 55,000.

EXAMPLE 4

Paint Preparation

The 50% tributyltin-containing-polymer solution in xylene as prepared in each of Examples 1–3 was mixed with other paint ingredients in accordance with the following recipe in a ball mill to prepare a standard test paint.

| Standard Test Paint Composition: | % by weight |
| --- | --- |
| Polymer solution of Example 1 (for Paint A), Example 2 (for Paint B) or Example 3 (for Paint C) | 50 |
| Cuprous oxide | 35 |
| Iron red | 5 |
| Talc | 5 |
| Xylene | 5 |

EXAMPLE 5

Storage Stability Test

The standard test paints A, B and C prepared in Example 4 were tested for storage stability with and without the addition of 0.5% by weight of a stabilizing agent, namely 2,6-di-tert-butylphenol, 2,6-di-tert-butyl-alpha-dimethylamino-p-cresol, tert-butylhydroquinone, 2,5-di-tert-butylhydroquinone, 2,5-di-tert-amylhydroquinone, 2,2'-methylenebis(4-methyl-6-tert-butylphenol) or 2,2'-methylenebis(4-ethyl-6-tert-butylphenol). For carrying out the test in an accelerated manner, the test paints were each placed in a tightly stoppered 500-ml bottle and stored in a thermostat maintained at 50° C. for a month, while observing the paints for their condition at intervals.

Without addition of any stabilizing agent, Paints A, B and C each showed a significant viscosity increase after storage for 3 days and complete gelation after storage for 10–12 days. To the contrary, Paints A, B and C stabilized by the addition of any of the stabilizing agents mentioned above maintained their good condition throughout the 30-day storage period.

The stabilizing agent in accordance with the present invention may also be used in combination with an organic phosphorus compound, such as triphenyl phosphite and/or an organic sulfur compound, such as dilauryl thiodipropionate.

What is claimed is:

1. An antifouling paint composition stabilized against viscosity increase and gelation during storage which comprises triorganotin-containing polymer and cuprous oxide as combined active ingredients, a stabilizing amount of a hindered phenol, and a solvent therefor.

2. The composition of claim 1, wherein said triorganotin-containing polymer is a copolymer of tributyltin methacrylate and methyl methacrylate.

3. The composition of claim 1, wherein said triorganotin-containing polymer is a copolymer of tributyltin methacrylate, methyl methacrylate and an alkyl acrylate.

4. The composition of claim 3, wherein said alkyl acrylate is butyl acrylate.

5. The composition of claim 3, wherein said alkyl acrylate is 2-ethylhexyl acrylate.

6. The composition of any one of claims 1, 2, 3, 4, or 5, wherein said hindered phenol is a member selected from the group consisting of 2,6-di-tert-butylphenol, 2,6-di-tert-butyl-alpha-dimethylamino-p-cresol, tert-butylhydroquinone, 2,5-di-tert-butylhydroquinone, 2,5-di-tert-amylhydroquinone, 2,2'-methylenebis(4-methyl-6-tert-butylphenol) and 2,2'-methylenebis(4-ethyl-6-tert-butylphenol).

7. In an antifouling paint composition comprising triorganotin-containing polymer and cuprous oxide as combined active ingredients, the improvement comprising an amount of hindered phenol sufficient to stabilize said composition against viscosity increase and gelation during storage.

8. A composition according to claim 7 wherein the hindered phenol is 2,6-di-tert-butylphenol.

9. A composition according to claim 7 wherein the hindered phenol is 2,5-di-tert-butylhydroquinone.

10. A composition according to claim 7 wherein the hindered phenol is 2,2'-methylenebis(4-methyl-6-tert-butylphenol).

11. A composition according to claim 7 wherein the hindered phenol is 2,2'-methylenebis(4-ethyl-6-tert-butylphenol).

12. A method of stabilizing an antifouling paint composition, comprising, as combined active ingredients:
(a) triorganotin-containing polymer and
(b) cuprous oxide,
against viscosity increase and gelatin during storage, which comprises incorporating in the composision a stabilizing amount of a hindered phenol selected from the group consisting of 2,6-di-tert-butylphenol, 2,5-di-tert-butylhydroquinone, 2,2'-methylenebis(4-methyl-6-tert-butylphenol) and 2,2'-methylenebis(4-ethyl-6-tert-butylphenol).

* * * * *